United States Patent [19]
Glaser

[11] Patent Number: 6,072,463
[45] Date of Patent: Jun. 6, 2000

[54] WORKSTATION CONFERENCE POINTER-USER ASSOCIATION MECHANISM

[75] Inventor: Howard Justin Glaser, San Jose, Calif.

[73] Assignee: International Business Machines Corporation, Armonk, N.Y.

[21] Appl. No.: 08/425,309

[22] Filed: Apr. 17, 1995

Related U.S. Application Data

[63] Continuation of application No. 08/165,772, Dec. 13, 1993, abandoned.

[51] Int. Cl.$^7$ .................................................. G06F 3/14
[52] U.S. Cl. ............................................ 345/145; 379/262
[58] Field of Search .......................... 379/262; 395/200, 395/153, 155, 157, 159, 160, 650, 800; 345/145, 157, 163, 2, 330, 329, 333, 334, 335; 348/15; 364/228.3, 228.4

[56] References Cited

U.S. PATENT DOCUMENTS

| | | | |
|---|---|---|---|
| 4,280,135 | 7/1981 | Schlossberg | 358/93 |
| 4,653,090 | 3/1987 | Hayden | 379/204 |
| 4,882,743 | 11/1989 | Mahmoud | 379/53 |
| 4,953,159 | 8/1990 | Hayden et al. | 370/62 |
| 4,974,173 | 11/1990 | Stefik et al. | 364/521 |
| 4,995,071 | 2/1991 | Weber et al. | 379/53 |
| 5,008,853 | 4/1991 | Bly et al. | 364/900 |
| 5,073,926 | 12/1991 | Suzuki et al. | 379/53 |
| 5,107,443 | 4/1992 | Smith et al. | 395/153 X |
| 5,124,909 | 6/1992 | Blakely et al. | 395/200 |
| 5,124,912 | 6/1992 | Hotaling et al. | 364/401 |
| 5,195,086 | 3/1993 | Baumgartner et al. | 370/62 |
| 5,208,912 | 5/1993 | Nakayama et al. | 395/200 |
| 5,220,657 | 6/1993 | Bly et al. | 395/425 |

OTHER PUBLICATIONS

Steve Whittaker, Susan E. Brennan, Herbert H. Clark, "Co–ordinating Activity: An Analysis of Interaction in Computer–Supported Co–operative Work" in Proceedings of CHI '91, ACM SIG on Computer Human Interaction, New Orleans, Louisiana, Apr. 27–May 2, 1991, pp. 361–367.

*Primary Examiner*—Kent Chang
*Attorney, Agent, or Firm*—Gray Cary Ware & Freidenrich

[57] ABSTRACT

A conference communication system that includes multiple user terminals, each of which includes a display screen with a common working area, provides each user with a pointer icon that can be moved across all the display screens with a pointing device, provides the display screen of each user with a representation of all the conference participants, and, for each user, displays a line connecting each pointer icon of the other conference participants to the displayed representation of the user controlling the icon. Each user controls a pointer icon with a display mouse device having buttons, and the pointer icon and line connecting a user with the user's pointer icon is only displayed on the screens of the other conference participants if the user has pressed and held down a button of the user's mouse device. In this way, each user has control of a pointer icon and each pointer icon is readily associated with the user controlling it, while the number of objects displayed in the work area is kept to a minimum.

54 Claims, 14 Drawing Sheets

| USER NODE ID | POINTER ICON POSITION | USER REPRESENTATION IMAGE (RELATIVE) POSITION |
|---|---|---|

FIG. 10

WORKSTATION CONFERENCE POINTER-USER ASSOCIATION MECHANISM

This application is a continuation of application Ser. No. 08/165,772, filed Dec. 13, 1993, now abandoned.

BACKGROUND OF THE INVENTION

1. Field of the Invention

This invention relates generally to communication systems and, more particularly, to computer workstation conference systems that permit users to communicate via display screens and simultaneously point to areas of all the user screens.

2. Description of the Related Art

Communication systems that support group workstation conferences have been the subject of recent research and development. Such systems include, for example, multiple user terminals, comprising workstations or personal computers, connected together over a network. Each of the user terminals includes a display device that displays a conference window having a common work area. The conference support system permits multiple workstation users to join a conference in which the system keeps track of conference participants and provides the display device of each participant with the conference window. A workstation user who is a conference participant can place a variety of images, such as objects and messages, in the work area and the system will duplicate the images such that they are displayed in the work area of all the other conference participant display devices. Thus, the work area serves as a video "whiteboard" on which users can share information during a conference. Video images of the participants may or may not be transmitted among the workstations and displayed in the conference window. The workstations also may provide for audio transmission among the participants. In this way, conference participants can interactively exchange voice, video, and written information.

For easier and more precise communication, workstation conference participants should have a way of designating or pointing to objects displayed in the work area of the conference windows during the conference. A common means of providing such a capability is to provide conference participants with a display device pointer, such as a movable cursor or pointer icon that can be moved about the common work area. All of the conference participants should be able to point to objects or data in the common work area. Moreover, conference participants should be able to associate a pointer with its corresponding user. A variety of workstation conference support systems provide such capabilities.

A conference support system, for example, can provide a single pointer icon that is shared in turn among the conference participants. Each workstation user is provided with a pointer control device, such as a display mouse or track ball. Such a system requires a mechanism for obtaining and then exchanging control of the pointer icon. When one user is finished using the pointer, the user must relinquish control. Pointer control must then be acquired by another user, or re-acquired by the previous user. As each conference participant wishes to point to some part of the display work area, pointer control must be passed among the conference participants. This can be a slow and cumbersome process that inhibits effective communication during a conference.

A conference support system also can permit each conference participant to have a unique pointer icon, which the participant has control of at all times. All of the conference participants can have pointer icons simultaneously active and present in the common work area of the conference window. The multiple pointers moving about the work area only serve to increase clutter and confusion. It will be appreciated that communication during a conference can be quite confusing if there are many conference participants and they all try to use pointers simultaneously. In practice, communication can become confusing as soon as more than two users are working with pointers. The work area quickly becomes crowded with objects and pointer icons, and it becomes difficult to associate particular pointers with particular users.

From the discussion above, it should be apparent that there is a need for a computer communication and conference support system that permits each one of multiple workstation users to control pointers during a workstation conference while each pointer is clearly associated with its respective user. The present invention satisfies this need.

SUMMARY OF THE INVENTION

In accordance with the invention, a communication and interactive conference support system that includes multiple user terminals, each of which includes a display screen with a common working area, provides each user with a pointer icon that can be moved across all the display screens with a pointing device, provides the display screen of each user with a representation of all the conference participants, and, for each user, displays a line connecting each pointer icon of the other conference participants to the displayed representation of the user controlling the icon. In this way, the system provides a mechanism by which each conference participant has control of a pointer icon and each pointer icon is readily associated with the user controlling it, while the number of objects displayed in the work area is kept to a minimum.

In one aspect of the invention, each user controls a pointer icon with a display mouse device having buttons, and the pointer icon and line connecting a user with the user's pointer icon is only displayed on the screens of the other conference participants if the user has taken a specific designating action, such as pressing and holding down a button of the user's mouse device. In this way, a pointer icon and line associating the icon with a user are displayed on the display screens of the other conference participants only if the user has taken a specific action, such as pressing a mouse button. Conference participants can refrain from having icons and connecting lines displayed on all other screens when they do not wish to designate or point to an object, thereby reducing clutter in the work area, but can activate an associated pointer and connecting line when necessary to point to an object.

In another aspect of the invention, the display screen of a given conference participant is not provided with a connecting line between the display representation of that participant and the participant's pointer icon. This reduces the number of images that must be displayed on the display screens of the participants, further reducing work area clutter. Because no connecting line is displayed on the participant's screen, it is readily apparent to each user which pointer icon is controlled by the user and which pointer icons are controlled by the other users. In this way, confusion regarding who controls which pointer icon in the work area is reduced.

Other features and advantages of the present invention should be apparent from the following description of the preferred embodiments, which illustrate, by way of example, the principles of the invention.

BRIEF DESCRIPTION OF THE DRAWINGS

FIG. 10 is a representation of the data fields of a conference participant table maintained by the conference support system illustrated in FIG. 1.

DESCRIPTION OF THE PREFERRED EMBODIMENTS

Figure 1:
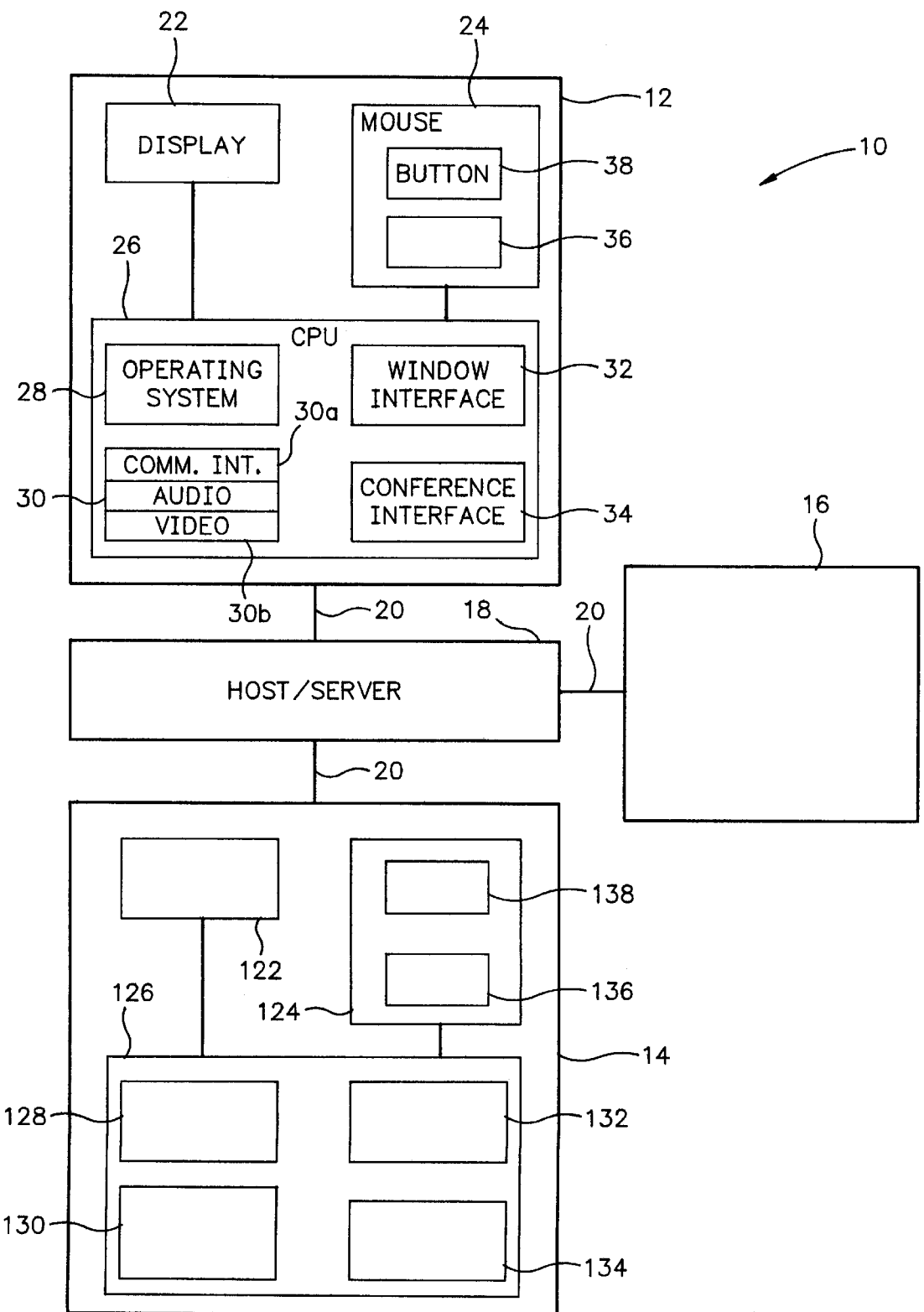
FIG. 1 is a block diagram of a communication and video conference support system constructed in accordance with the invention.

With reference to FIG. 1, a communication and interactive conference support system 10 constructed in accordance with the invention includes a plurality of user workstations 12, 14, 16 connected to a host network server 18 via network communication lines 20. The details of one of the user workstations 12 are shown, and should be understood to apply to the remaining workstations as well. Each workstation includes a display device 22 and a display mouse device 24. The system displays a pointer icon on the display devices of the workstations, along with a representation of all the workstation users participating in a conference. When a user takes a designating action, such as pressing a mouse button, the system displays a line connecting the pointer icon of the user with the representation of the user on the display devices of the other workstations. The users otherwise will not be provided with a display of the pointer icon and any connecting lines from other users. In this way, each workstation user has control of a pointer icon and each pointer icon is readily associated with the user controlling it, while the number of objects displayed on the screens is kept to a minimum.

Each user workstation 12, 14, 16 includes a workstation central processor unit (CPU) 26 that includes a workstation operating system 28, a communication interface 30, a window interface 32, and a conference interface 34. The operating system and interfaces can comprise, for example, software routines stored in program memory of the workstation and operating under the control of the CPU. An exemplary window interface can comprise Microsoft Windows by Microsoft Corporation or the Presentation Manager interface of the OS/2 system by IBM Corporation. The network server 18 controls communication between the network workstations 12, 14, 16. The network server also can include operating system and interface software routines stored in program memory of the server. In addition, the communication interface 30 of a workstation can include audio and video equipment, such as a microphone/speaker 30a and a video camera 30b, for converting the voice and image of a user at a workstation into corresponding audio and video signals that are transmitted among the conference participants over the network 20 and reproduced into audio and video output, respectively, at the workstations of the other conference participants.

The display mouse device 24 is well-known to those skilled in the art. The mouse includes a position transducer 36, such as a track ball, that provides position information as the mouse device is moved across a flat surface and thereby moves a pointer icon across the display 22. The mouse 24 also includes at least one mouse button 38 that can be pressed and held down to cause desired system responses. For example, when a first workstation user 12 wants to have his or her pointer icon and connecting line displayed on the displays 22 of the other workstation users 14 and 16, the first user 12 can position his or her pointer icon as desired and then press and hold down the mouse button 38. The details of providing this action are best explained with reference to the display representations of FIGS. 2–8.

Figure 2:
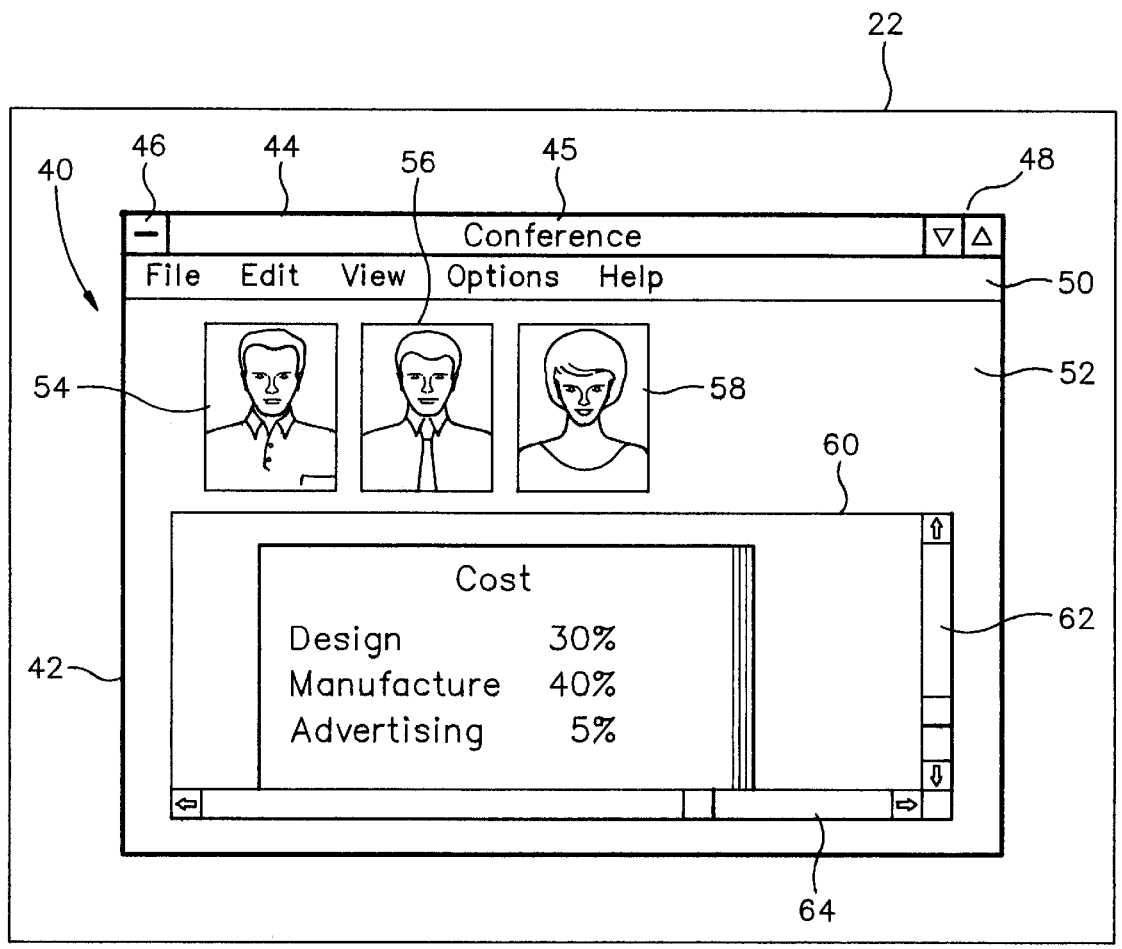
FIGS. 2, 3, 4, 5, 6, 7, and 8 are representations of the display screens of user workstations illustrated in FIG. 1.

FIG. 2 is a representation of the display generated by the system 10 on a display device 22, as observed by a user at a first workstation 12. The FIG. 2 representation comprises a conference window display 40 having a window frame 42 and title bar 44. The title bar includes a title 45, a menu icon 46, and window sizing icons 48. Beneath the title bar is a menu bar 50 showing drop-down menu selections entitled File, Edit, View, Options, and Help. Those skilled in the art will recognize that these window display elements are generated by the window interface 32 as a function of information provided by the conference interface 34.

Within the conference window 40 is displayed a window working space 52. Displayed within the working space are representations 54, 56, 58 of the conference participants at the first 12, second 14, and third 16 workstations, respectively. In the preferred embodiment, the representations are video images of the conference participants that comprise signals generated by the video equipment 30b of the communication interface 30. Alternatively, these representations can be icons or other system-generated metaphors representing the conference participants. In the preferred embodiment, the communication interface digitizes the audio and video signals generated by the respective audio 30a and video 30b equipment for transmission over the network 20.

Within the window working space 52 is a whiteboard working area 60. The area is called a whiteboard working area to emphasize the similarity between a chalkboard or erasable marker whiteboard, both of which are commonly used by most persons who might be conference participants, and the working area 60 displayed by the conference interface 34. Thus, those skilled in the art will appreciate that the conference participants can use keyboards of their respective workstations and their display mouse devices and the like to enter information in the common whiteboard area 60 and have the information displayed in the whiteboard area of all the conference participants. A vertical scroll bar 62 is provided at the right edge of the working area and a horizontal scroll bar 64 is provided along the bottom edge of the work area. As will be familiar to those skilled in the art, the scroll bars are used to control positioning of the objects displayed in the work area.

Figure 3:
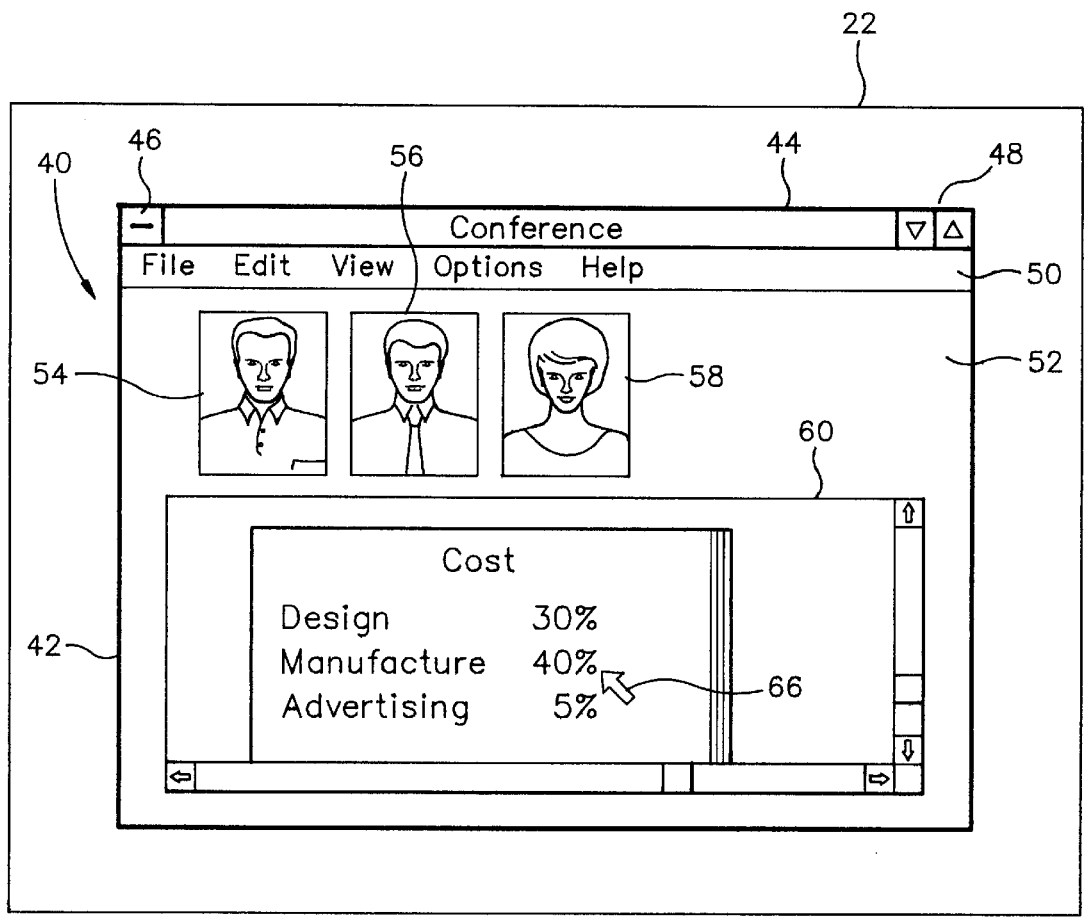

FIG. 2 represents the display observed by all conference participants on their respective display devices. Thus, at the time represented by FIG. 2, none of the conference participants has pressed and held down a button on their respective mouse devices. FIG. 3 represents the display observed by a user at a first workstation 12. The first user has used his mouse device 24 to move a pointer icon 66 provided by the window interface 32 into the work area 60. In FIG. 3, the pointer icon is shown pointing at a second line of the display labeled "Manufacture 40%".

Figure 4:
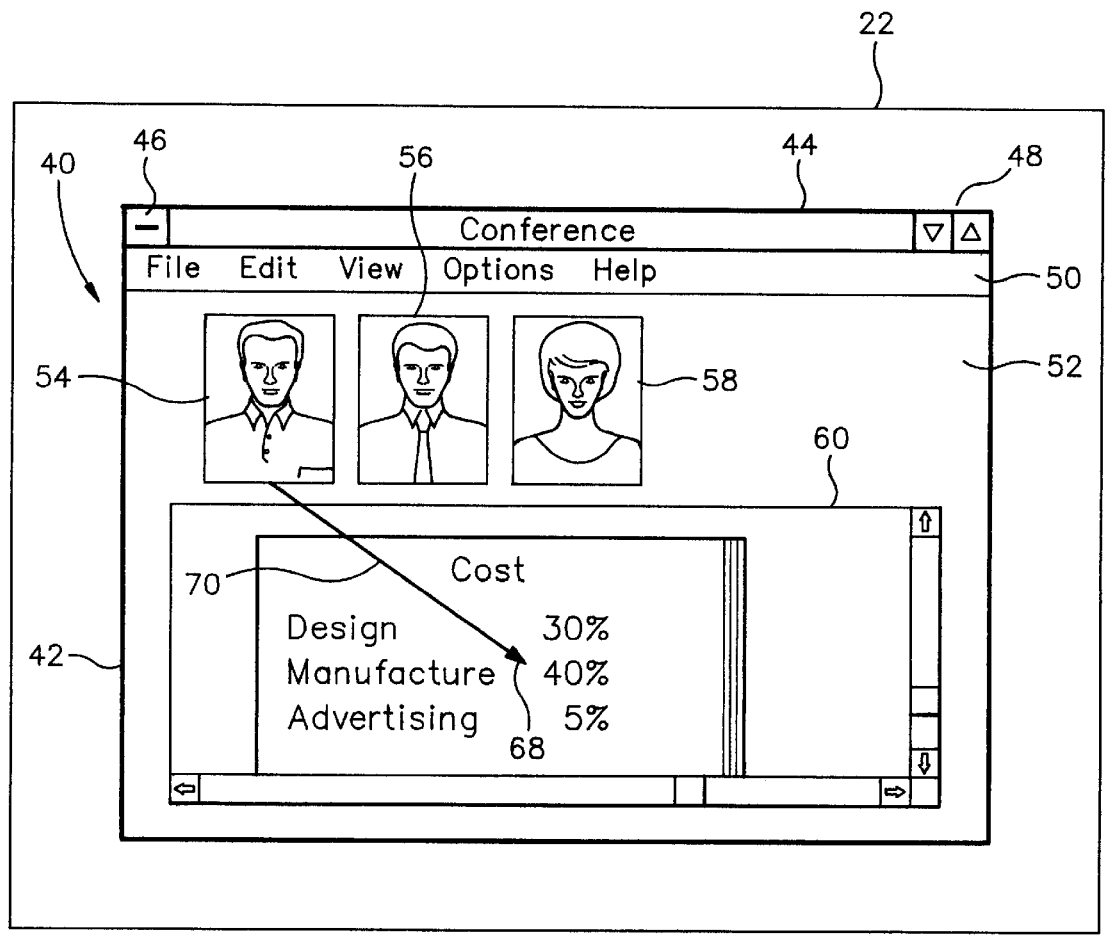

FIG. 4 is a representation of the display observed by a user at the second workstation 14 and by a user at the third workstation 16 on their respective display devices 22. FIG. 4 shows a pointer icon arrowhead 68 at the second line of the display connected by a connecting line 70 to the first user representation 54. The connecting line extends from approximately the midpoint of the first user representation bottom edge to the first user pointer icon location as indicated by the arrowhead 68. The arrowhead is oriented so as to point from the user representation to the pointer icon location.

Figure 5:
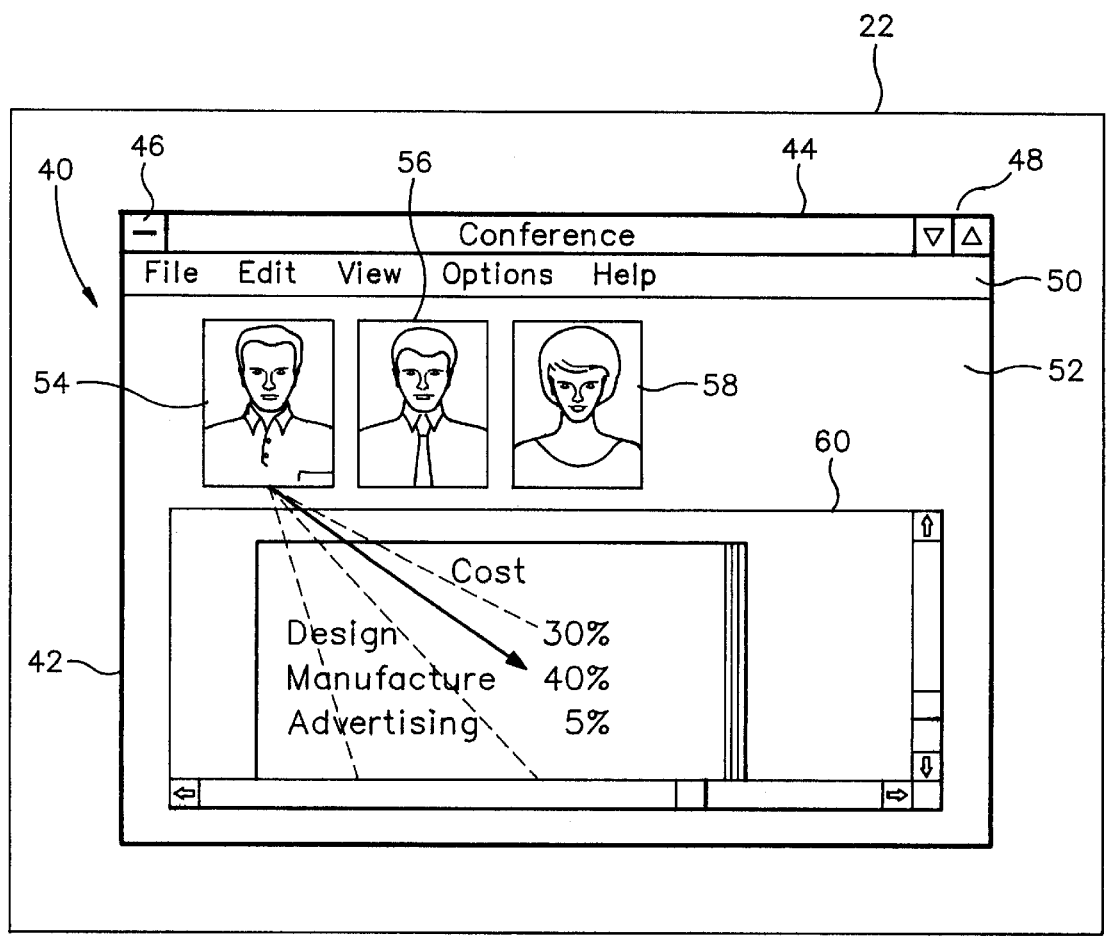

FIG. 5 is a representation of the display observed by the users at the second and third workstations 14, 16 when the first user continues pressing his mouse button 38 and moving the mouse device 24 about. The dotted lines in FIG. 5 represent movement of the pointer icon arrowhead 68 and connecting line 70 with the mouse. Thus, the position of the arrowhead and the associated end of the connecting line varies as the first user moves his mouse device about, while the opposite endpoint of the connecting line remains connected to approximately the bottom midpoint of the first user representation 54.

Figure 6:
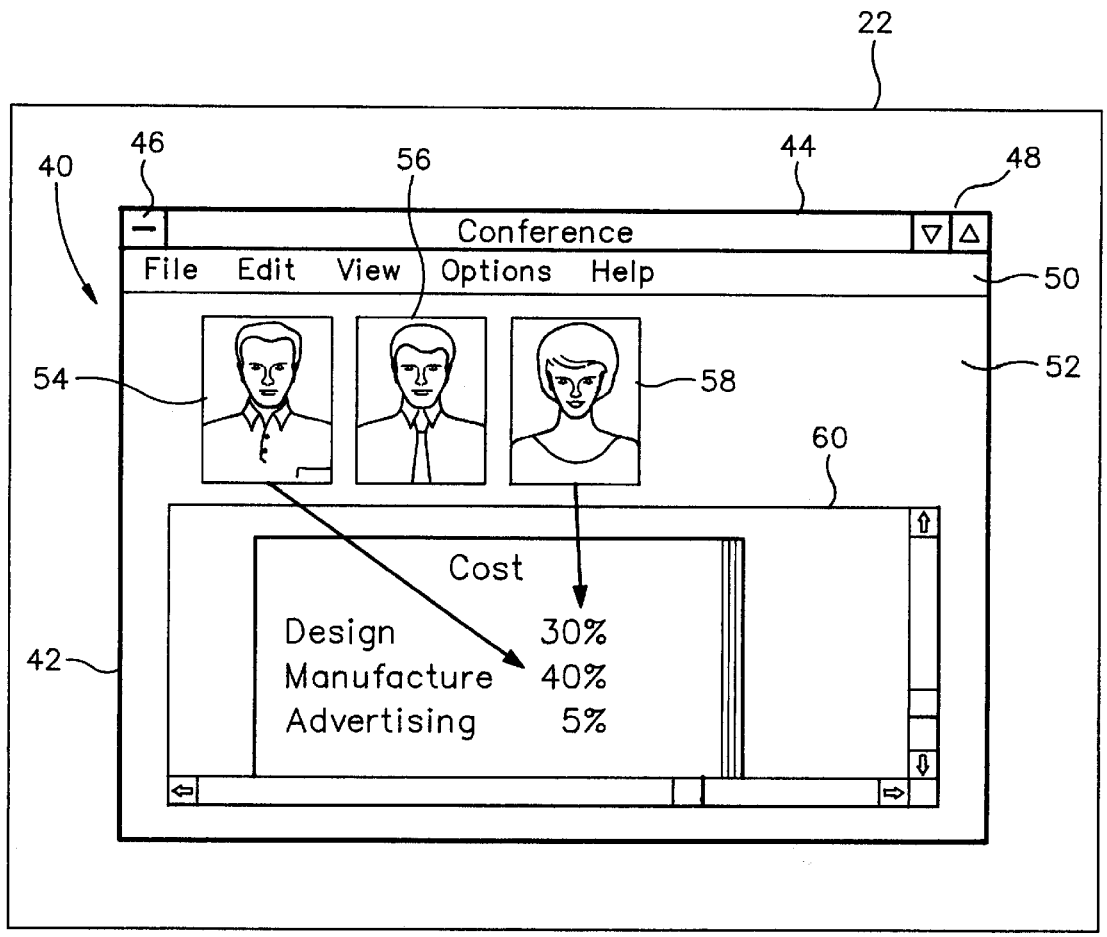

FIG. 6 is a representation of the display observed by the user at the second workstation 14 when the user at the third workstation 16 is pointing to the first line in the whiteboard work area 60 and the user at the first workstation 12 is pointing to the second line of the work area. Thus, it should be apparent that FIG. 6 represents a situation in which both the third user and first user have positioned their respective pointer icons at different lines of the whiteboard and have both pressed and held down their respective mouse buttons.

Figure 7:
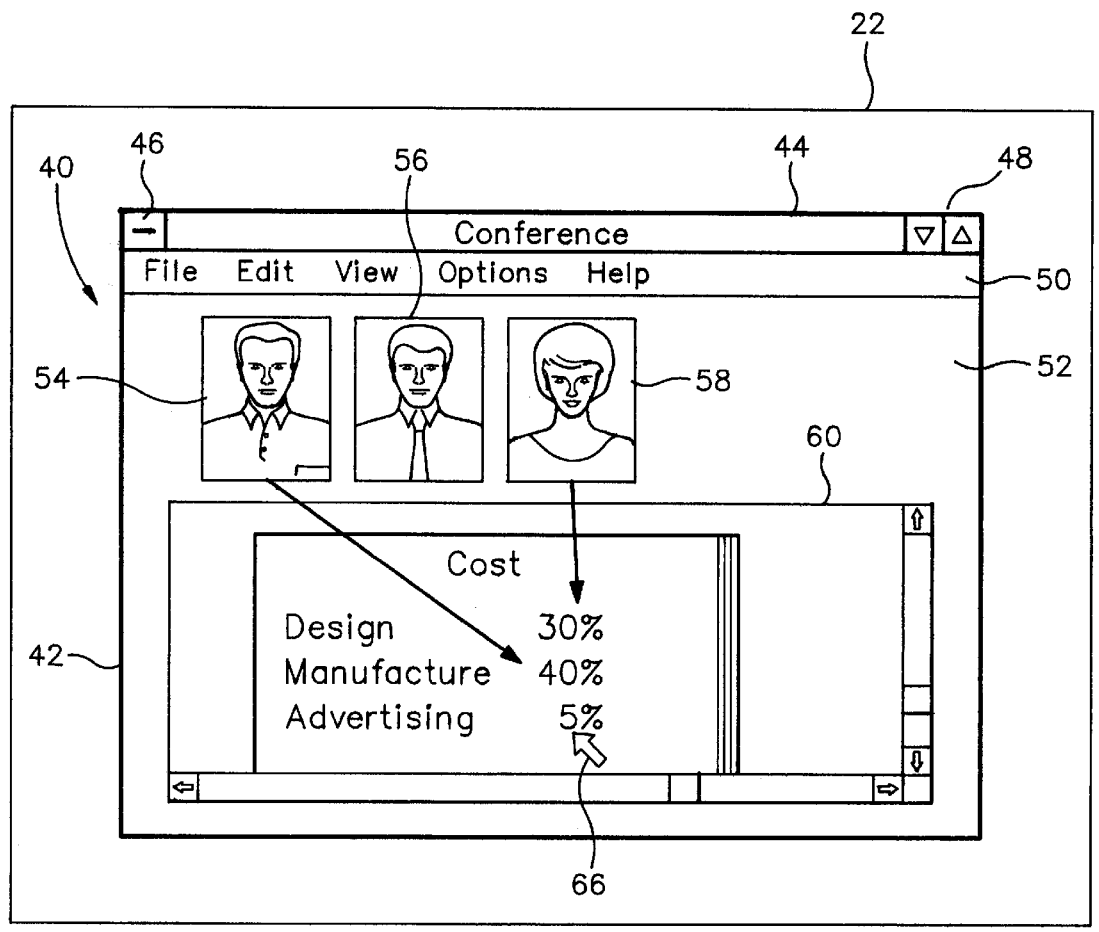
Figure 8:
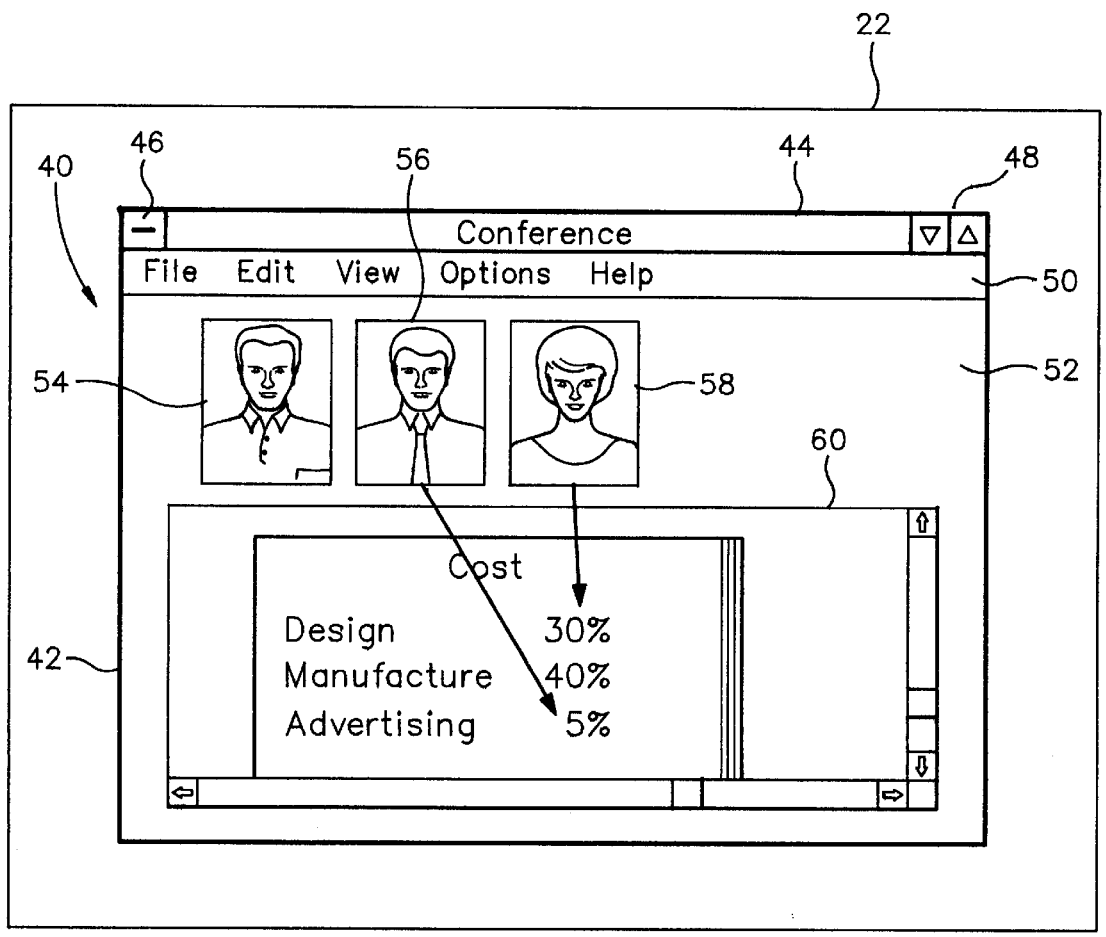

FIG. 7 is a representation of the display observed by the user at the second workstation 14. It should be apparent that FIG. 7 represents a situation in which the second user has positioned his pointer icon 66 at the third line of the whiteboard area 60 and has pressed down his mouse button. It should be noted that the pointer icon representing the second user that is displayed on the second user's display device is of a different shape from the arrowhead representing the other conference participants. In this way, a user can readily distinguish between the pointer icon of the user himself and the arrows of the other users. Finally, FIG. 8 is a representation of the display observed by the user at the third workstation 16.

The manner in which the various displays illustrated in FIGS. 2–8 are generated by the system 10 will now be explained in greater detail with reference back to the block diagram of FIG. 1. The operating system interface 28, communication interface 30, and window interface 32 should be well-defined and well-known to those skilled in the art. Those skilled in the art will be able to construct the appropriate workstation CPU instruction necessary to provide the displays illustrated in FIGS. 2–8, in conjunction with this accompanying description.

Figure 9:
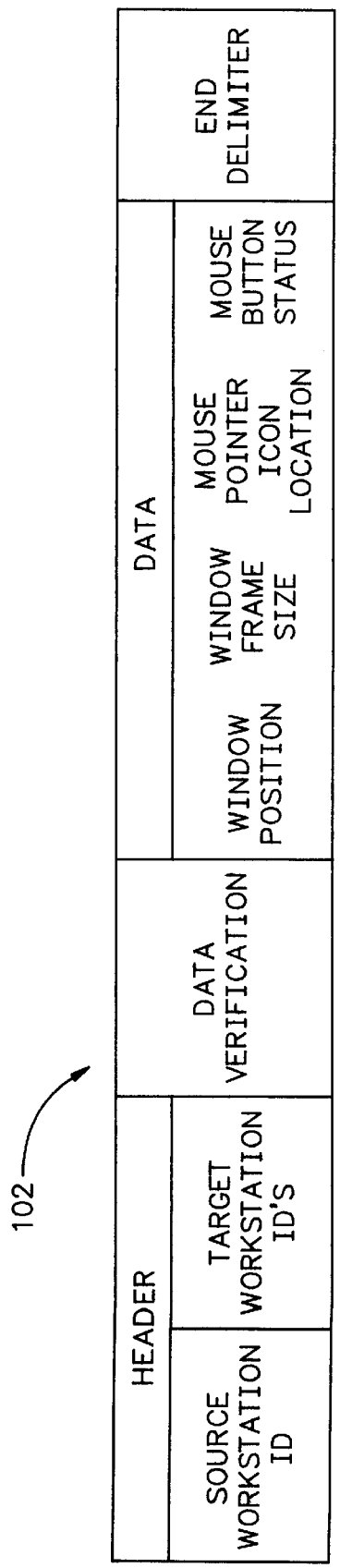
FIG. 9 is a representation of the user identification/node table maintained by the conference support system illustrated in FIG. 1.

As noted above, the users at the various workstations 12, 14, 16 are linked together by a network 20, whose communications are managed by a host computer/network server 18. The host/server implements a message packet protocol that permits each workstation to both transmit and receive messages containing packets of information over the network. FIG. 9 is a representation of the fields comprising an information packet 102. Each packet of information is assembled under control of the respective CPU 26, 126 of each workstation and includes the data fields illustrated in FIG. 9 that comprise a header that identifies the source workstation, identifies the target workstation or workstations, provides data verification information, and a data field, followed by an end delimiter. The data contained within an information packet can include, for example, window display position information, window frame size information, mouse device pointer icon location, and mouse button status.

As illustrated in FIG. 9, an information packet 102 provided to the host/server 18 includes source workstation and target workstation fields. Thus, a workstation user providing, for example, pointer information intended for all conference participants would require forming an information packet having workstation identification information for each of the other conference participants in the header field. Network workstations would process only relevant messages. In operation, the network workstations would monitor the network for messages in which they are identified as the target workstation. When a workstation detects a message for which it is the intended recipient, the workstation processes the message, incorporating the data in the message into its conference window display. Thus, as many information packets as there are conference participants would be formed for each change in a workstation window display.

Alternatively, target workstations could generate a single information packet for each change in display, such as a pointer change. In that case, the header field for a source workstation information packet 102 would include, for example, a source identification field having a code or flag to indicate that the information packet should be accepted by all conference users. The target workstation field could be eliminated from the information packet header or could be replaced by a conference participant field that would be recognized by conference participant workstation CPU's as identifying an information packet that should be accepted and processed by all conference participants.

As known to those skilled in the art, the location of the mouse pointer icon in the display of a workstation is provided by the window interface 32. The mouse button states also are provided by the window interface. The conference interface 34 makes use of such information as described above in FIG. 9 in controlling display of the windows, icons, and pointers. The conference interface 34 maintains a conference participant table illustrated in FIG. 10 containing the user identification data for each conference participant. The table provides a list to verify where message packets should be sent when a user sends information packets to other conference participants and maintains state information for each conference participant. The state information includes position data for the user's mouse pointer icon and position data for representations of conference participants in the conference display window. The conference participant table of FIG. 10 is created by the conference interface 34 when the conference session is initialized.

When a conference participant points to any position in the whiteboard area 60 and presses the button 38 on his or her mouse device 24, a computer event is generated. A computer event is an occurrence that causes the conference interface 34 to generate a data signal that comprises an information packet and to transmit the information packet to the workstations of the other conference participants. The conference interface generates two types of computer events. The first type of computer event is a mouse-button-up event. This indicates to the other users that the first conference participant has not pressed the mouse button. The second type of event is a mouse-button-down-and-coordinates event. This second type of computer event provides mouse pointer icon position data and provides an indication that the user has pressed and held down the mouse button.

To reduce messages across the network 20, the conference interface 34 of a sending workstation only sends a mouse-button-down-and-coordinates event message on the first occurrence of the event or whenever the workstation user changes the position of the mouse device 24 while holding down the mouse button 38. In this way, the user can hold down the mouse button and move the pointer icon about in his or her display window, as illustrated in FIG. 5, and information packets will be sent over the network 20 only as needed. The position data sent as a result of the mouse-button-down-and-coordinates event reflects the relative coordinates of the mouse pointer icon within the display window rather than the absolute coordinates. This ensures consistency in positioning the pointer icon when the display windows have been resized by a user.

FIG. 10 is a representation of the data fields comprising a conference participant table in which is stored conference participant information received from information packets. When a user workstation receives an information packet containing updated mouse computer event information, the conference participant table illustrated in FIG. 10 is updated. As noted above, the table contains mouse pointer icon position information. Thus, the table contains sufficient information to redraw the pointers, arrowheads, and connecting lines. If the mouse computer event information contains a mouse-button-down-and-coordinates event, then the table is updated with the new coordinates for that user's mouse pointer icon. If the information is a mouse-button-up event, then the table is updated by clearing or deleting any existing coordinates and replacing them with a blank or null entry.

Upon receipt of an information packet and subsequent updating of the conference participant table of FIG. 10, the conference windows are refreshed or redrawn to reflect the change in mouse pointer icon position. First, downwardly pointing arrows are drawn at a position on the display device corresponding to the coordinates in the conference participant table. A connecting line is then drawn from the bottom center of each user's representation image to the pointer arrowhead associated with that user. In the case where the table entry for the pointer icon position of a user is blank, no pointer icon arrowhead or connecting line is drawn for that user. The updating and refreshing of the window displays with the new computer event information provides the illusion of dynamic movement of the pointer arrow.

At the initiation of a conference session, the conference interface 34 registers conference participants by placing the appropriate information in the participant table illustrated in FIG. 10. Conventional conference interface systems provide a variety of ways in which conference sessions can be initiated and conference participants can be registered so that communication between participants can take place. Those skilled in the art will appreciate a number of ways in which such participant registration can be implemented. Therefore, it is unnecessary to describe the details of such a registration procedure in this document.

Figure 11:
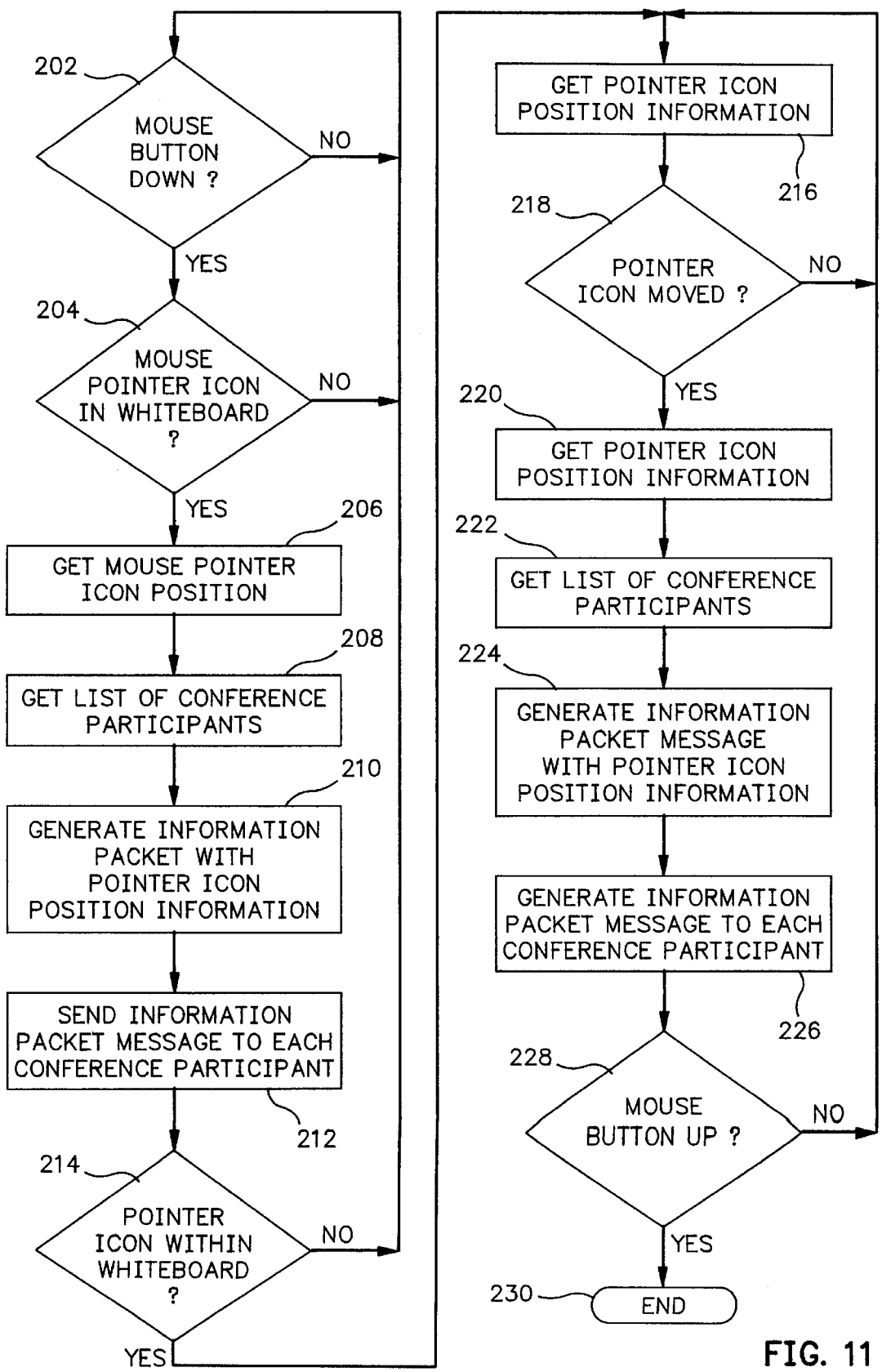
FIGS. 11, 12, and 13 are flow diagrams of the processing steps carried out by the conference support system illustrated in FIG. 1.

FIG. 11 is a flow diagram illustrating the sequence of processing steps followed when a conference participant uses his or her workstation to point to a data object in the work area 60. At a first decision box 202, the workstation CPU 26 determines if the user at a first workstation 12 has pressed the mouse button 38 down. If the mouse button has not been pressed, then the user is not generating a computer event and processing returns to the input of decision box 202 to monitor for the pressing of the mouse button. If the mouse button is pressed down, an affirmative response at box 202, then the workstation CPU next determines if the mouse pointer icon is located within the whiteboard work area 60, as indicated by the decision box numbered 204. If the pointer icon is not within the whiteboard work area, then the pointer icon is not located at a position that is of concern to the conference interface 34, and therefore processing returns to the input of the first decision box 202.

If the workstation user has pressed the mouse button 38 and the mouse pointer icon is located within the work area 60, then at box 206 the workstation CPU 26 obtains the mouse pointer icon position information from the information packet received over the network 20. At the flow diagram box numbered 208, the CPU obtains a list of the conference participants, which comprises the identification numbers of the remaining entries in the conference participant table of FIG. 10. Next, the workstation CPU creates an information packet containing the mouse pointer icon location information at the flow diagram box numbered 210. At the flow diagram box numbered 212, the CPU sends the information packet over the network 20 to each conference participant.

At the decision box numbered 214, the workstation CPU 26 checks to determine if the mouse pointer icon is located within the whiteboard work area 60. If it is not, then once again the processing returns to the first decision box 202. If the mouse pointer icon is within the work area, then at the flow diagram box numbered 216 the CPU determines the pointer icon position. Next, at the decision box numbered 218, the CPU determines if the pointer icon has moved. If the pointer icon has not moved, then processing returns to the flow diagram box numbered 216 where the pointer icon position is obtained. If the pointer icon has moved, an affirmative response at the decision box numbered 218, then the CPU next obtains the new mouse pointer icon position at the flow diagram box numbered 220.

The workstation CPU 26 next obtains the list of conference participants from the conference participant table at the flow diagram box numbered 222. At the flow diagram box numbered 224, the CPU creates an information packet containing the mouse pointer icon location information and at the flow diagram box numbered 226 the CPU sends each conference participant the information packet. After the information packets have been sent, the CPU next determines if the mouse button 38 has been released at the decision box numbered 228. If the mouse button has been released, then the user is no longer designating a point within the work area 60 and the routine can end at the end box numbered 230. If the mouse button has not been released, then processing returns to the flow diagram box numbered 216, where the pointer icon position is obtained.

Figure 12:
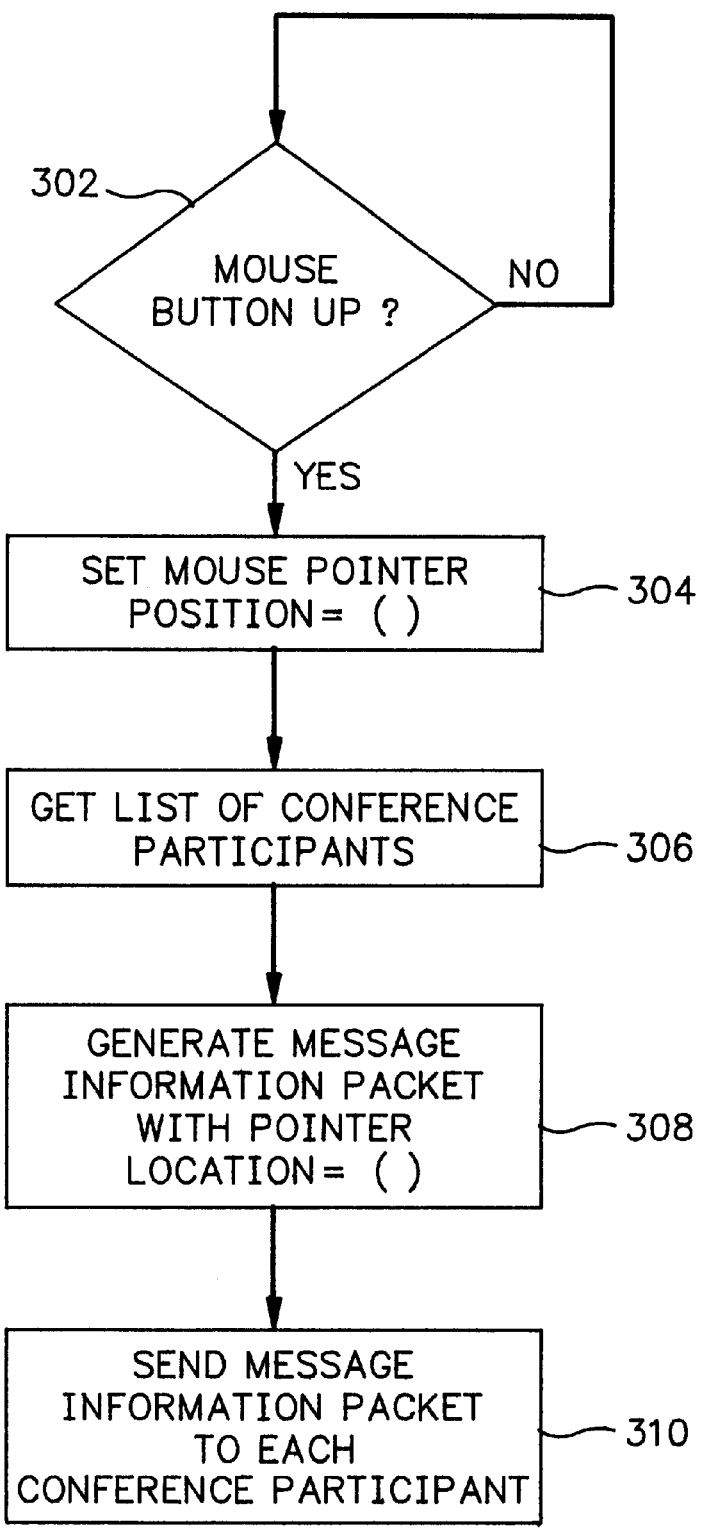

FIG. 12 shows the processing steps followed when the sender's machine detects that the mouse button 38 has been released. At the decision box numbered 302, the workstation CPU 26 determines if the mouse button has been released. If the mouse button has not been released, then processing returns back to the input of decision box 302. When the release of the mouse button is detected, an affirmative response at the decision box, then processing proceeds to the flow diagram box numbered 304 where the mouse pointer icon position is set equal to a null value. At the next box numbered 306, the workstation CPU obtains the list of conference participants from the conference participant table. Next, at the flow diagram box numbered 308, the CPU creates an information packet with the pointer icon location set to the null value. Finally, at the flow diagram box numbered 310, the CPU sends the information packet to each conference participant.

Figure 13:
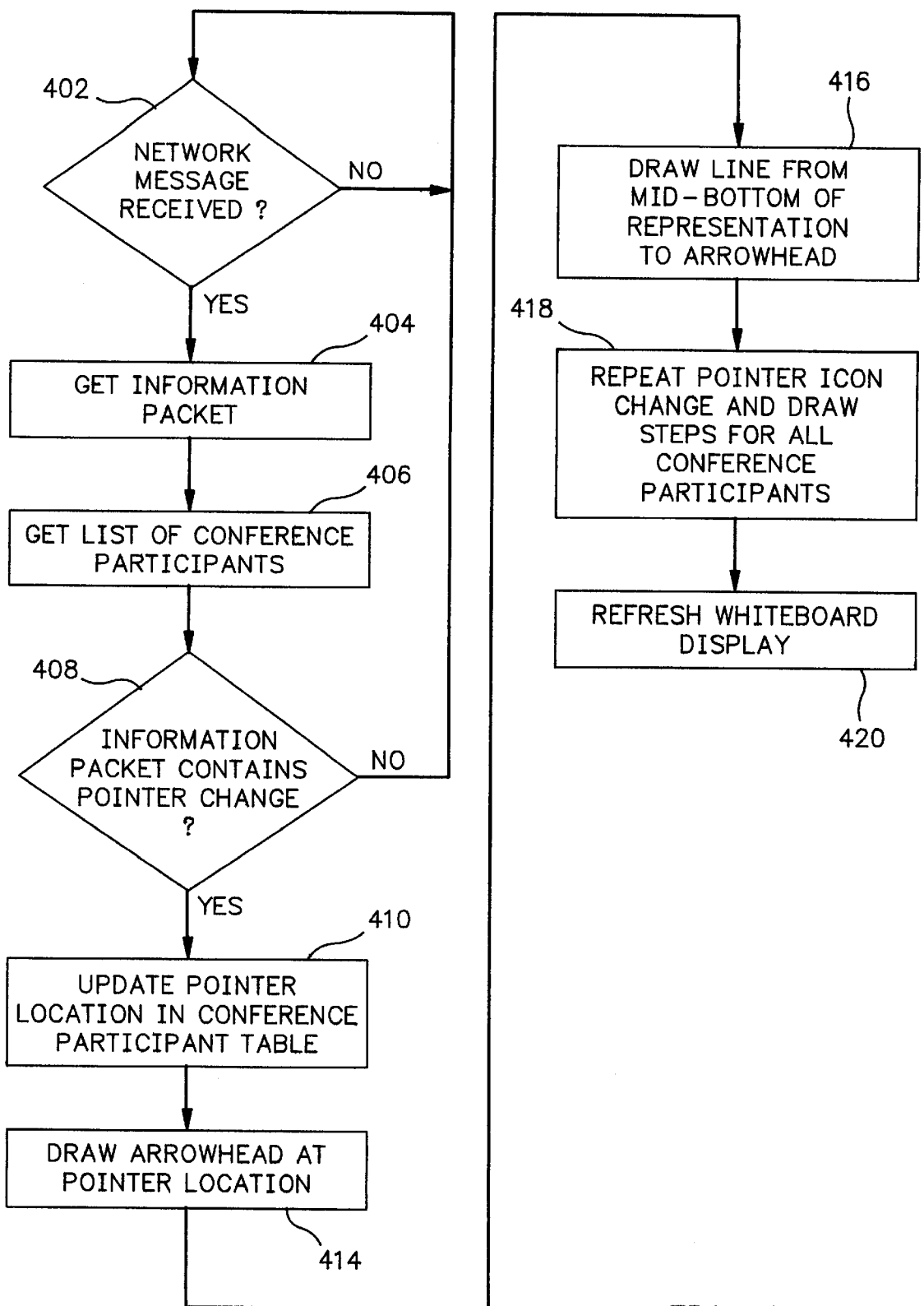

FIG. 13 shows the processing steps followed when the workstation of a conference participant receives a network information packet. At the decision box numbered 402, the workstation first checks for receipt of an information packet. If no information packet is detected, then processing returns to the input of the decision box 402, waiting for the next packet. Once a network information packet is received, the workstation CPU obtains the data in the information packet at the flow diagram box numbered 404. At the flow diagram box numbered 406, the CPU obtains a list of the conference participants from the conference participant table. Next, at the decision box numbered 408, the CPU checks to determine if the information packet contains pointer icon position change data. If no such field is included, then processing returns to the input of decision box 402 for monitoring for a network information packet. If the information packet does include pointer icon position change data, then at the flow diagram box numbered 410 the CPU updates the stored pointer icon location information for the conference participants in the conference participant table.

Next, at the flow diagram box numbered 414, the workstation CPU 26 draws a pointer arrowhead at the indicated location from the conference participant table. At the flow diagram box numbered 416, the CPU draws a line from the midpoint of the bottom of the participant's representation in the window to the pointer icon arrowhead. At flow diagram box 418, the workstation CPU continues with that processing until the position information processing for all conference participants has been completed. Finally, at flow diagram box number 420, the workstation CPU refreshes the display of the whiteboard work area 60.

A better understanding of the operation of the system 10 can be gained from review of the following pseudocode, which corresponds to the processes followed by the CPU 26 of each workstation, as described in the flow diagrams of FIGS. 11–13. In the pseudocode, the following variables are used:

```
Location        relative location of the mouse pointer
                icon for a particular workstation
fromMe          the identification number or user node of a
                particular workstation
packet          the information packet received by a workstation
                CPU over the network
pointerChange   mouse button status flag to indicate button
                is pressed or not pressed
Sender's machine . . .
ON mouseButton1 down
    GET mousePointer position
        IF mousePointer WITHIN whiteBoard THEN
            SET Location = mousePointer
            GET Participants
            FOR each Participants: SEND TO each Participant:
                (fromMe, pointerChange, Location)
        ELSE END;
    WHILE mouseButton1 down and mousePointer within whiteBoard
        GET mousePointer position
        If mousePointer ≠ Location THEN
            FOR each Participants: SEND to each Participant:
            SET Location = mousePointer
                (fromMe, pointerChange, Location)
    WEND.
ON mouseButton1 up
        SET Location = ( )
        FOR each Participants: SEND to each Participant:
            (fromMe, pointerChange, Location)
Receiver's machine . . .
ON net message
    SET packet = message
    IF packet includes string = "pointerChange" THEN
        FOR each participant: IF each Participant = ( GET fromMe
            FROM packet)
```

-continued

```
        THEN
            GET Location FROM packet
            SET mousePointer = Location
        FOR each Participant: IF Location ≠ ( ) THEN
            DRAW pointer at Location; DRAW line FROM picture
            frame ((x,y),(x'/2, y)) to Location
        REFRESH whiteBoard
ELSE END
```

In the pseudocode above, processing by a sender's machine is described first, followed by the processing of a receiver's machine. In the sender's machine pseudocode, the CPU first detects that the mouse button is pressed down, a button status of "down", at the code beginning with "GET mousePointer position". The next sequence of steps in the IF ... ELSE END loop involves getting the mouse pointer icon position. As illustrated in the pseudocode, if the mouse pointer icon is located within the whiteboard work area, then the Location variable is set equal to the mouse pointer icon position data and then the workstation identification number, pointer change flag, and pointer location data are sent to each of the conference participants.

Next, if the mouse button flag status is "down", and if the mouse pointer icon position is within the whiteboard work area, then the workstation CPU obtains the mouse pointer icon position data. Next, the IF . . . THEN loop indicates that if the mouse pointer icon position data is not equal to the Location variable, indicating that the position has changed, then for each one of the conference participants, the workstation CPU sends the updated mouse pointer icon position data to each one of the remaining conference participants. Finally, at the pseudocode for "ON mouseButton1 up", the Location variable is initially set to the null set. Then, because the mouse button flag data indicates that the mouse button has been released, the mouse button location data is sent to each one of the remaining conference participants.

In the pseudocode for the receiver's machine, the workstation CPU first monitors the network for network information packet messages. When a message is received, the information packet is set equal to the message obtained. If the information packet includes pointer change information, then for each participant, the workstation CPU determines if the pointer icon change data is from a different workstation. If it is, then the pointer icon location is retrieved from the information packet and the mouse pointer data is set equal to that location. In the next sequence of pseudocode steps, for each participant, if the location data has changed from the prior value, then a workstation draw function provided by the window interface is implemented whereby a pointer icon is drawn at a display position indicated by the location data and then a line is drawn from the bottom midpoint of the user representation to the position specified by the pointer icon location data. Lastly, a refresh function for drawing the whiteboard work area is invoked.

Figure 14:
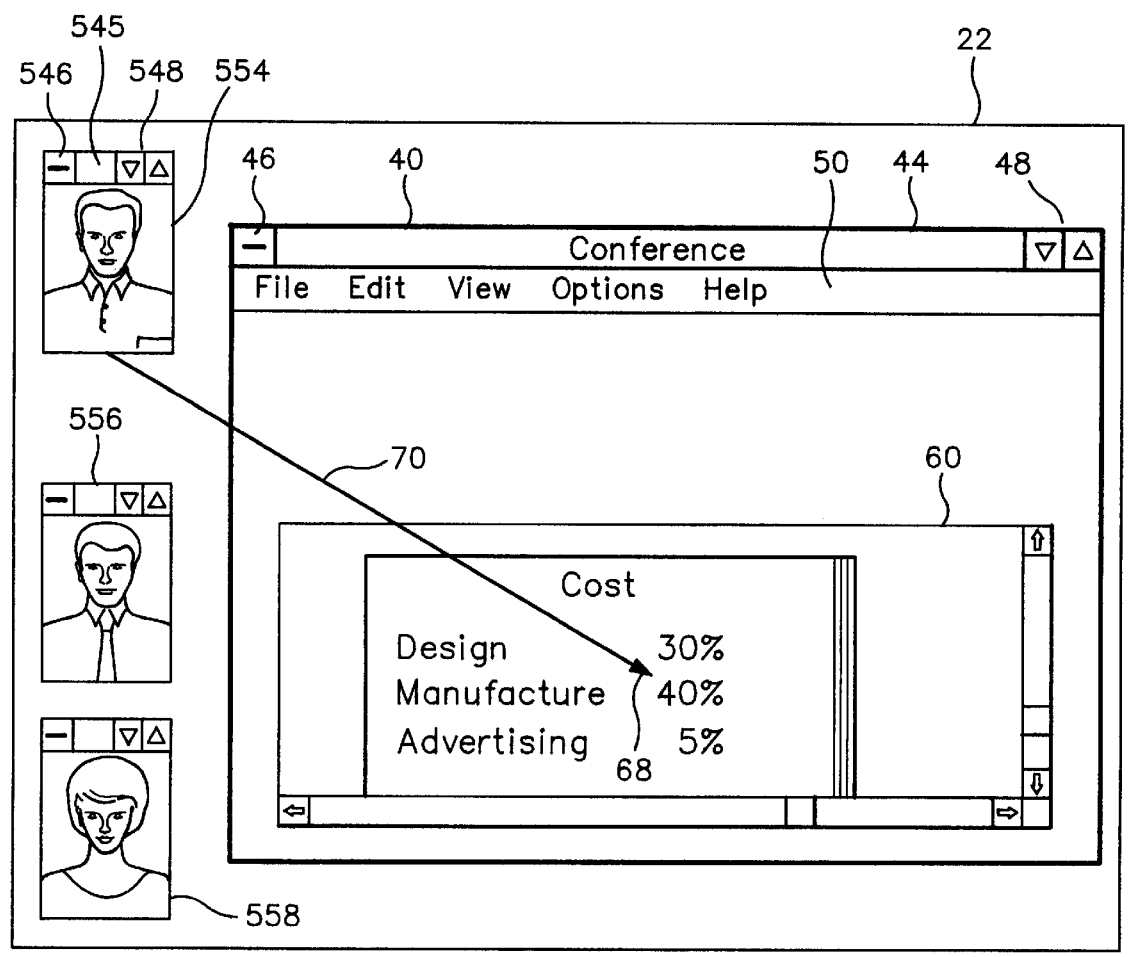
FIG. 14 is a representation of an alternate display screen format provided by the conference support system illustrated in FIG. 1.

Those skilled in the art will appreciate that changes can be made to the illustrated displays without departing from the teachings of the present invention. For example, the conference interface can provide the representations of the conference participants as separate windows within the conference window. Each conference participant window then can be resized and moved about the display. Thus, in FIG. 14, a display 22 observed by a workstation user includes a conference window display 40 and representations 554, 556, 558 of three workstation users who are conference participants such that each user representation is a window. Thus, each conference participant window includes a window menu icon 546, window title bar 545, and window sizing icon 548. In FIG. 14, each of the participant windows 554, 556, 558 has been dragged out of the conference window 40 and positioned elsewhere on the display 22, or desktop. The participant windows 554, 556, 558 are not shown with a menu bar 50, but one could be included if desired. Those skilled in the art will appreciate that the participant window 554 of a first conference participant has been enlarged relative to the other two. FIG. 14 illustrates that the arrowhead 68 and connecting line 70 are drawn from a user representation 554 to the pointer icon location, despite the fact that the user representation is no longer positioned in the conference window 40. Thus, FIG. 14 represents an alternate embodiment to FIG. 4.

The participant window feature offers a workstation user greater control in obtaining precisely the display format of greatest use. Those skilled in the art will appreciate how to provide the user representation window feature in conjunction with the operating system 28, window interface 32, and conference interface 34, described above.

In the conference support system described above, multiple user workstations each include a display screen with a common work area and the system provides each workstation user with a pointer icon that can be moved across all the display screens with a mouse pointing device and provides the display of each user with a representation of all conference participants. For each workstation user, the conference support system displays a line connecting each pointer icon of the other conference participants to the displayed representation of the user controlling the icon. In this way, each user has control of the pointer icon and each pointer icon is readily associated with the user controlling it, while the number of objects displayed in the whiteboard work area is kept to a minimum.

The present invention has been described above in terms of a presently preferred embodiment so that an understanding of the present invention can be conveyed. There are, however, many configurations for conference support systems not specifically described herein but with which the present invention is applicable. The present invention should therefore not be seen as limited to the particular embodiment described herein, but rather, it should be understood that the present invention has wide applicability with respect to conference support systems generally. All modifications, variations, or equivalent arrangements that are within the scope of the attached claims should therefore be considered to be within the scope of the invention.

I claim:

1. A communication conference support system for use with a first workstation of a computer system having a plurality of user workstations connected over a network and participating in a conference, including at least the first user workstation and a second user workstation, each workstation having a display device with a display screen on which is displayed a pointer icon and a mouse pointer device that controls movement of the pointer icon on the display device as the mouse pointer device is moved and that includes a mouse button, the support system of the first workstation comprising:

position means for generating a signal that indicates the position of the pointer icon on the display device of the first user workstation and indicates the status of the workstation mouse button;

picture means for generating a representation of the system users in a conference window of the display device of the first user workstation;

designator means for generating a signal that identifies the first user workstation and indicates the location of the pointer icon and system user representation on the display device of the first user workstation;

a system interface that receives the position means signal, picture means representation, and designator means signal of the first workstation and arranges them in an information packet for transmission over the network; and association means for receiving an information packet containing a position means signal, picture means representation, and designator means signal from the second workstation and any other workstations connected to the network and participating in the conference, and for drawing a line on the display device of the first user workstation connecting the display device location of a pointer icon identified by the designator means signal to the representation of the corresponding system user generated by the picture means signal for the second workstation and for all other conference participating user workstations of the system, thereby displaying a connecting line between the representations of all conference participants and their respective pointer icons except for the representation of a viewing participant and that participant's pointer icon.

2. A system as defined in claim 1, wherein the picture means comprises a workstation video camera that generates a video image of the first workstation user and provides it to the association means for transmission to all conference participant workstations.

3. A system as defined in claim 2, wherein the picture means generates a digital representation of the video image.

4. A system as defined in claim 1, wherein the position means comprises a network message information packet.

5. A system as defined in claim 4, wherein the information packet includes a header field that identifies a message source workstation and a message target workstation and a data field that provides the mouse button status.

6. A system as defined in claim 5, wherein the data field further provides the mouse pointer icon location on the display device of the respective workstation.

7. A system as defined in claim 6, wherein the data field further provides conference window position information.

8. A system as defined in claim 1, wherein the network server maintains a conference participant table that contains an identification of each workstation participating in the conference and of the mouse pointer icon location on the display device of the respective workstation.

9. A system as defined in claim 8, wherein each workstation generates a network information packet message when the mouse button of its respective mouse device is pressed, the information packet including a header field that identifies a message source workstation and a message target workstation and a data field that provides the mouse button status.

10. A system as defined in claim 9, wherein the data field further provides the mouse pointer icon location on the display device of the respective workstation.

11. A system as defined in claim 10, wherein the data field further provides conference window position information.

12. A system as defined in claim 8, wherein each workstation generates a network information packet message when the mouse button of its respective mouse device is pressed, the information packet including a header field that identifies a message source workstation and a message target workstation and a data field that provides the mouse pointer icon location.

13. A system as defined in claim 1, wherein the designator means comprises a conference participant table maintained by the network server.

14. A system as defined in claim 1, wherein the association means comprises a workstation conference interface.

15. A system as defined in claim 14, wherein the conference interface displays a pointer arrow on the display devices of the remaining conference participants that is different in appearance from the mouse pointer icon of the button pressing first conference participant.

16. A video conference support system for use in a first user workstation and at least a second user workstation connected by a network server that controls communications between the workstations, each user workstation having a video display device with a display screen on which is displayed a pointer icon and having a mouse pointer device that includes a mouse button and controls movement of the pointer icon on the display device as the mouse pointer device is moved, the conference support system comprising:

an image generator in each workstation that provides a video representation signal of the user at each system workstation;

a communication interface in each workstation that digitizes the video representation signal provided by each respective image generator and that transmits information packets over the network;

a pointer icon indicator in each workstation that generates a signal indicating the position of the pointer icon on the display device of each respective user workstation as the pointer icon of the user workstation is moved;

a mouse device detector in each workstation that generates a signal identifying each respective user workstation and pointer icon location on the display device when the pointer button of the respective user workstation is pressed;

a line generator in each user workstation that draws respective lines on the display device of the respective user workstation that connects a pointer icon identified by the button detector of each other respective workstation to the representation of the corresponding user of the workstation generated by the image generator for all of the other user workstations of the system; and a conference interface in each workstation that generates information packets containing the user workstation identification and mouse pointer icon position information when a user presses the mouse button of the user's workstation mouse device.

17. A system as defined in claim 16, wherein the network server maintains a conference participant table that contains an identification of each workstation participating in the conference and of the mouse pointer icon location on the display device of the respective workstation.

18. A system as defined in claim 16, wherein each workstation responds to pressing of its respective mouse button by generating a network information packet that includes a header field identifying a message source workstation and a message target workstation and a data field providing the mouse button status.

19. A system as defined in claim 18, wherein the data field further provides the mouse pointer icon location on the display device of the respective workstation.

20. A system as defined in claim 19, wherein the data field further provides conference window position information.

21. A system as defined in claim 16, wherein each workstation generates a network information packet message when the mouse button of its respective mouse device is pressed, the information packet including a header field that identifies a message source workstation and a message target workstation and a data field that provides the mouse pointer icon location.

22. A method of maintaining communications between users at conference workstations of a network, wherein each workstation in the network includes a display device on which is displayed a conference window having a pointer icon and includes a mouse pointer device having a mouse button and controlling a pointer icon on the display device as the workstation mouse pointer device is moved, the method comprising the steps of:

generating a display representation of each conference participant;

displaying the conference participant representations in the conference window of the display device of each conference participant workstation;

determining when a first conference participant has pressed the mouse button of the participant's workstation mouse device;

determining the display device location of the pointer icon of the button pressing first conference participant at the time of the button pressing; and displaying a pointer arrow in the conference window of the display devices of all the remaining conference participants extending from each respective display device representation of the button pressing first conference participant to the determined pointer icon location of the button pressing first conference participant, thereby displaying a connecting line between the representations of all conference participants and their respective pointer icons except for the representation of a viewing participant and that participant's pointer icon.

23. A method as defined in claim 22, further including the step of maintaining a conference participant table that contains an identification of each workstation participating in the conference and of the mouse pointer icon location on the display device of the workstation.

24. A method as defined in claim 22, wherein the step of determining the pressing of a mouse button comprises generating a network information packet message including a header field that identifies a message source workstation and a message target workstation and a data field that provides the mouse button status.

25. A method as defined in claim 24, wherein the step of determining the display device pointer icon location comprises generating a network information packet that further comprises generating a data field that also provides the mouse pointer icon location.

26. A method as defined in claim 24, wherein the step of generating a data field further comprises providing conference window position information in the data field.

27. A method as defined in claim 22, wherein the step of determining the display device pointer icon location comprises generating a network information packet message including a header field that identifies a message source workstation and a message target workstation and a data field that provides the mouse pointer icon location.

28. A method as defined in claim 22, wherein the step of displaying a pointer arrow comprises displaying a pointer arrow on the display devices of the remaining conference participants that is different in appearance from the mouse pointer icon of the button pressing first conference participant.

29. A method as defined in claim 22, wherein the step of generating a representation of each conference participant comprises producing a video image of each conference participant and transmitting the video images over the network to the workstation of each conference participant.

30. A method as defined in claim 29, wherein the step of producing a video image comprises generating a digital representation of the video image.

31. A communication conference support system for use with a first workstation that communicates with a plurality of other workstations under control of a network server while participating in a network conference, each user conference workstation having a display device on which is displayed a pointer icon of the respective workstation and a mouse pointer device that controls movement of the pointer icon on the display device as the mouse pointer device is moved and that includes a mouse button; the support system of the first workstation comprising:

position means for generating a signal that indicates the position of the pointer icon on the display device of the first workstation and indicates the status of the mouse button;

an image capture device that generates a representation of the user at the first workstation;

designator means for generating a signal that identifies the user at the first workstation and indicates the location of a pointer icon and a workstation representation displayed on the display device of the first workstation; and association means for drawing a line on the display device of the first workstation that connects the pointer icon of each respective other workstation identified by the designator means to the representation of the corresponding workstation.

32. A system as defined in claim 31, wherein the image capture device comprises a workstation video camera that generates a video image signal of the first workstation user and provides it to the network server for transmission to all respective other communicating workstations.

33. A system as defined in claim 32, wherein the image capture device generates a digital representation of the video image signal.

34. A system as defined in claim 31, wherein the position means comprises a network message information packet.

35. A system as defined in claim 34, wherein the information packet includes a header field that identifies the first workstation as the source workstation, identifies a message target workstation, and includes a data field that provides the mouse button status of the first workstation.

36. A system as defined in claim 35, wherein the data field further provides the mouse pointer icon location on the display device of the first workstation.

37. A system as defined in claim 36, wherein the data field further provides conference window position information.

38. A system as defined in claim 31, wherein the association means comprises a workstation conference interface.

39. A communication conference support system for use in a first workstation that communicates with a plurality of respective other conference participating workstations through a network server that controls communications between the workstations, the first and respective other workstations each having a display device on which is displayed a pointer icon and a mouse pointer device that controls movement of the pointer icon on the display device as the mouse pointer device is moved and that includes a mouse button; the conference support system of the first workstation comprising:

an image generator that provides a video representation of the user at the first workstation;

a communication interface that digitizes the video representation provided by the image generator and that transmits information packets over the network;

a pointer icon indicator that generates a signal indicating the position of the pointer icon on the display device of the first workstation as the pointer icon is moved;

a mouse device detector that generates a signal identifying the first workstation and the pointer icon location on the display device of the first workstation when the pointer button of the first workstation is pressed;

a conference interface that generates information packets containing the first workstation identification and mouse pointer icon position information when the first workstation user presses the mouse button of the first workstation mouse device and receives corresponding information packets from the respective other workstations; and a line generator that draws a line on the first workstation display device that connects the pointer icon identified by the button detector to the representation of the corresponding system user generated by the image generator.

40. A system as defined in claim 39, wherein the first workstation generates a network information packet message when the mouse button of the first workstation mouse device is pressed, the information packet including a header field that identifies the first workstation as the source workstation and identifies a message target workstation and includes a data field that provides the mouse pointer icon location.

41. A method of maintaining conference communication by a first workstation participating with respective other workstations of a network during a user conference, wherein each workstation includes a display device on which is displayed a conference window with a pointer icon and a mouse pointer device that includes a mouse button and controls movement of the pointer icon as the first workstation mouse pointer device is moved, the method comprising the steps of:

generating a signal representation of each conference participant workstation user for display on the first workstation and respective other workstation display devices;

displaying the conference participant representations in the conference window of the first workstation and respective other workstation display devices;

determining when one of the other respective conference participants has pressed the mouse button of that participant's workstation mouse device;

determining the display device pointer icon location of the button pressing conference participant; and displaying a pointer arrow on the display device of the first workstation from the display device representation of the button pressing conference participant to the determined display pointer icon location of the button pressing conference participant.

42. A method as defined in claim 41, wherein the step of determining when a conference participant has pressed the mouse button comprises generating a network information packet message including a header field that identifies the respective other user workstation as the message source and identifies a message target workstation and includes a data field that provides the mouse button status.

43. A method as defined in claim 42, wherein the step of determining the display device pointer icon location comprises the step of generating a network information packet that includes a data field that indicates the mouse pointer icon location.

44. A method as defined in claim 43, wherein the step of generating a data field further comprises providing conference window position information in the data field.

45. A method as defined in claim 42, wherein the step of determining the display device pointer icon location comprises the step of generating a network information packet message including a header field that identifies the message source workstation and identifies a message target workstation and a data field that provides the mouse pointer icon location.

46. A method as defined in claim 41, wherein the step of generating a signal representation of each conference participant comprises producing a video image of the conference participant and providing it over the network to each workstation.

47. A method as defined in claim 46, wherein the step of producing a video image comprises generating a digital representation of the video image.

48. In a system having a first workstation and a plurality of other workstations comprising a network, the workstations communicating with each other during a user conference, wherein each workstation includes a display device on which is displayed a conference window with a representation of a user at each workstation, a pointer icon, and a mouse pointer device that includes a mouse button and controls movement of the pointer icon as the first workstation mouse pointer device is moved, a method of associating the pointer icons of the respective user representations on the display with the respective user representations, the method comprising the steps of:

generating a signal representation of each workstation user for display on the first workstation and respective other workstation display devices;

displaying the conference participant representations in the conference window of the first workstation and respective other workstation display devices;

determining when one of the respective conference participants other than the user at the first workstation has pressed the mouse button of that participant's workstation mouse device;

determining the display device pointer icon location of the button pressing conference participant; and displaying a pointer arrow on the display device of the first workstation from the display device representation of the button pressing conference participant to the determined display pointer icon location of the button pressing conference participant, thereby displaying a connecting line between the representations of all conference participants and their respective pointer icons except for the representation of a viewing participant and that participant's pointer icon.

49. A method as defined in claim 48, wherein the step of determining when a conference participant has pressed the mouse button comprises generating a network information packet message including a header field that identifies the respective other user workstation as the message source and identifies a message target workstation and includes a data field that provides the mouse button status.

50. A method as defined in claim 49, wherein the step of determining the display device pointer icon location comprises the step of generating a network information packet that includes a data field that indicates the mouse pointer icon location.

51. A method as defined in claim 50, wherein the step of generating a data field further comprises providing conference window position information in the data field.

52. A method as defined in claim 49, wherein the step of determining the display device pointer icon location comprises the step of generating a network information packet message including a header field that identifies the message source workstation and identifies a message target workstation and a data field that provides the mouse pointer icon location.

53. A method as defined in claim 48, wherein the step of generating a signal representation of each conference participant comprises producing a video image of the conference participant and providing it over the network to each workstation.

54. A method as defined in claim 53, wherein the step of producing a video image comprises generating a digital representation of the video image.

* * * * *